(12) United States Patent
Tejnil

(10) Patent No.: US 8,792,147 B2
(45) Date of Patent: Jul. 29, 2014

(54) METHOD, PROGRAM PRODUCT AND APPARATUS FOR CREATING OPTIMAL TEST PATTERNS FOR OPTICAL MODEL CALIBRATION AND FOR SELECTING SUITABLE CALIBRATION TEST PATTERNS FROM AN ARBITRARY LAYOUT

(75) Inventor: Edita Tejnil, Cupertino, CA (US)

(73) Assignee: ASML Netherlands B.V., Veldhoven (NL)

( * ) Notice: Subject to any disclaimer, the term of this patent is extended or adjusted under 35 U.S.C. 154(b) by 1391 days.

(21) Appl. No.: 11/889,574

(22) Filed: Aug. 14, 2007

(65) Prior Publication Data

US 2008/0068667 A1   Mar. 20, 2008

Related U.S. Application Data

(60) Provisional application No. 60/837,326, filed on Aug. 14, 2006.

(51) Int. Cl.
*H04N 1/46*   (2006.01)

(52) U.S. Cl.
USPC ............ 358/504; 358/406; 358/1.9; 382/162; 716/21; 716/55; 716/53; 430/5; 430/30

(58) Field of Classification Search
USPC ................. 358/406, 1.9; 382/162; 716/21
See application file for complete search history.

(56) References Cited

U.S. PATENT DOCUMENTS

| 7,488,933 | B2 * | 2/2009 | Ye et al. ..................... 250/252.1 |
| 2003/0082463 | A1 * | 5/2003 | Laidig et al. ..................... 430/5 |
| 2007/0140552 | A1 * | 6/2007 | Fan et al. ..................... 382/162 |

* cited by examiner

*Primary Examiner* — Quang N Vo
(74) *Attorney, Agent, or Firm* — Pillsbury Winthrop Shaw Pittman LLP

(57) ABSTRACT

A method of determining calibration test patterns to be utilized to calibrate a model for simulating the imaging performance of an optical imaging system. The method includes the steps of defining a model equation representing the imaging performance of the optical imaging system; transforming the model equation into a plurality of discrete functions; identifying a calibration pattern for each of the plurality of discrete functions, where each calibration pattern corresponding to one of the plurality of discrete functions being operative for manipulating the one of the plurality of discrete functions during a calibration process; and storing the calibration test patterns identified as corresponding to the plurality of discrete functions. The calibration test patterns are then utilized to calibrate the model for simulating the imaging performance of an optical imaging system.

18 Claims, 9 Drawing Sheets

METHOD, PROGRAM PRODUCT AND APPARATUS FOR CREATING OPTIMAL TEST PATTERNS FOR OPTICAL MODEL CALIBRATION AND FOR SELECTING SUITABLE CALIBRATION TEST PATTERNS FROM AN ARBITRARY LAYOUT

PRIORITY CLAIM

This application claims priority to Provisional Application Ser. No. 60/837,326, filed on Aug. 14, 2006, the contents of which are incorporated herein in its entirety.

TECHNICAL FIELD

This disclosure relates generally to lithographic simulation tools. More particularly, it relates to a method for generating test patterns to be utilized in the process of calibrating an imaging model utilized to simulate the imaging performance of the optical imaging system.

BACKGROUND

Lithographic apparatus can be used, for example, in the manufacture of integrated circuits (ICs). In such a case, the mask may contain a circuit pattern corresponding to an individual layer of the IC, and this pattern can be imaged onto a target portion (e.g., comprising one or more dies) on a substrate (silicon wafer) that has been coated with a layer of radiation-sensitive material (resist). In general, a single wafer will contain a whole network of adjacent target portions that are successively irradiated via the projection system, one at a time. In one type of lithographic projection apparatus, each target portion is irradiated by exposing the entire mask pattern onto the target portion in one go; such an apparatus is commonly referred to as a wafer stepper. In an alternative apparatus, commonly referred to as a step-and-scan apparatus, each target portion is irradiated by progressively scanning the mask pattern under the projection beam in a given reference direction (the "scanning" direction) while synchronously scanning the substrate table parallel or anti-parallel to this direction. Since, in general, the projection system will have a magnification factor M (generally>1), the speed V at which the substrate table is scanned will be a factor M times that at which the mask table is scanned. More information with regard to lithographic devices as described herein can be gleaned, for example, from U.S. Pat. No. 6,046,792, incorporated herein by reference.

In a manufacturing process using a lithographic projection apparatus, a mask pattern is imaged onto a substrate that is at least partially covered by a layer of radiation-sensitive material (resist). Prior to this imaging step, the substrate may undergo various procedures, such as priming, resist coating and a soft bake. After exposure, the substrate may be subjected to other procedures, such as a post-exposure bake (PEB), development, a hard bake and measurement/inspection of the imaged features. This array of procedures is used as a basis to pattern an individual layer of a device, e.g., an IC. Such a patterned layer may then undergo various processes such as etching, ion-implantation (doping), metallization, oxidation, chemo-mechanical polishing, etc., all intended to finish off an individual layer. If several layers are required, then the whole procedure, or a variant thereof, will have to be repeated for each new layer. Eventually, an array of devices will be present on the substrate (wafer). These devices are then separated from one another by a technique such as dicing or sawing, whence the individual devices can be mounted on a carrier, connected to pins, etc.

For the sake of simplicity, the projection system may hereinafter be referred to as the "optics;" however, this term should be broadly interpreted as encompassing various types of projection systems, including refractive optics, reflective optics, and catadioptric systems, for example. The radiation system may also include components operating according to any of these design types for directing, shaping or controlling the projection beam of radiation, and such components may also be referred to below, collectively or singularly, as a "lens." Further, the lithographic apparatus may be of a type having two or more substrate tables (and/or two or more mask tables). In such "multiple stage" devices the additional tables may be used in parallel, or preparatory steps may be carried out on one or more tables while one or more other tables are being used for exposures. Twin stage lithographic apparatus are described, for example, in U.S. Pat. No. 5,969,441, incorporated herein by reference.

The photolithographic masks referred to above comprise geometric patterns corresponding to the circuit components to be integrated onto a silicon wafer. The patterns used to create such masks are generated utilizing CAD (computer-aided design) programs, this process often being referred to as EDA (electronic design automation). Most CAD programs follow a set of predetermined design rules in order to create functional masks. These rules are set by processing and design limitations. For example, design rules define the space tolerance between circuit devices (such as gates, capacitors, etc.) or interconnect lines, so as to ensure that the circuit devices or lines do not interact with one another in an undesirable way. A critical dimension of a circuit can be defined as the smallest width of a line or hole or the smallest space between two lines or two holes. Thus, the CD determines the overall size and density of the designed circuit.

Due to an accuracy requirement for optical proximity correction (OPC) at very low k1 (<0.4), more accurate representation of the performance of the exposure tool in simulations has become critical to accommodate the reduction of device pattern dimensions. As is known, the modeling of complex optical imaging and patterning processes often relies on empirical models with adjustable parameters that have to be calibrated using measured data. Such empirical models are used in photolithography and advanced imaging applications, including optical proximity correction (OPC) of layout in photolithography, post-OPC layout verification, die-to-database photomask pattern inspection, etc. The empirical models of the imaging process have adjustable parameters that are optimized, or "calibrated", using measured data. In other words, the adjustable parameters are adjusted until the simulated imaging result matches the actual imaging result (i.e., the measured data) within some predefined error criteria. In case of OPC in lithographic patterning, the calibration data may be, for example, CD SEM measurements of patterns from semiconductor wafers. In case of mask inspection, the calibration data may be, for example, images of the mask measured on the inspection tool. However, one difficulty associated with performing model calibration is that the calibration data set (e.g., the patterns utilized to calibrate the imaging model) needs to be small in number/size for fast optimization of the model parameters, but also versatile enough to cover the complete set of possible patterns that could be encountered in the full layout of the design pattern of interest. Indeed, the more patterns utilized to calibrate the imaging model, the more robust and useful the resulting model will likely be when predicting the imaging results of an actual target pattern. Thus, there are conflicting interests associated with the selection of patterns to be utilized to calibrate the imaging model (i.e., the need for a large number of calibration patterns necessary to generate a robust model versus the time required to calibrate the model).

Currently, the selection of test patterns for calibrating the simulation model is typically performed by an experienced designer. For example, the designer may select patterns comprising some frequently occurring features found in typical target patterns, and some features that historically have caused problems (experience), and some new features that are critical to the design. However, a selection of calibration or test patterns guided only by experience and intuition may not adequately calibrate the simulation model for all of the patterns and features the model may be utilized to actually simulate during operation.

Accordingly, there is need for a method for selecting/determining the calibration or test patterns to be utilized to calibrate the simulation model which optimizes the usefulness or robustness of the model while simultaneously reducing the number of calibration patterns necessary for the calibration process so as to minimize the time required for the calibration process.

SUMMARY

This disclosure relates to a method, computer program product and apparatus for determining/selecting an optimal set of test patterns (to be utilized in the calibration process) as well as the selection of the most suitable test patterns based on an arbitrary layout pattern (e.g., target pattern). The method entails generating a cross-correlation transform function (i.e., TCC) that the defines the optical imaging system and then selecting test structures that contribute to all of the terms in the cross-correlation transform function. If the calibration pattern (i.e., test structures) contributes to every term in the cross-correlation transform function, then the properties of every possible type of pattern that can be transmitted by the imaging system are included in the test structures utilized to perform the calibration. As a result, a more accurate calibration process and therefore model is produced.

A method of determining calibration test patterns to be utilized to calibrate a model for simulating the imaging performance of an optical imaging system. The method includes the steps of defining a model equation representing the imaging performance of the optical imaging system; transforming the model equation into a plurality of discrete functions; identifying a calibration pattern for each of the plurality of discrete functions, where each calibration pattern corresponding to one of the plurality of discrete functions being operative for manipulating the one of the plurality of discrete functions during a calibration process; and storing the calibration test patterns identified as corresponding to the plurality of discrete functions. The calibration test patterns are then utilized to calibrate the model for simulating the imaging performance of an optical imaging system.

As explained in more detail below, the method of the present invention provides significant advantages over the prior art. Most importantly, the method provides for the systematic determination of optimal calibration or test patterns to be utilized for calibrating a simulation model. The calibration test patterns optimize the usefulness or robustness of the model while simultaneously reducing the number of calibration patterns necessary for the calibration process so as to minimize the time required for the calibration process, and eliminates the need for an experienced design engineer to determine the calibration test patterns.

Another advantage of the present invention is that it provides for a method of determining the suitable calibration test patterns from an arbitrary existing layout.

Although specific reference may be made in this text to the use of the invention in the manufacture of ICs, it should be explicitly understood that the invention has many other possible applications. For example, it may be employed in the manufacture of integrated optical systems, guidance and detection patterns for magnetic domain memories, liquid-crystal display panels, thin-film magnetic heads, etc. The skilled artisan will appreciate that, in the context of such alternative applications, any use of the terms "reticle," "wafer" or "die" in this text should be considered as being replaced by the more general terms "mask," "substrate" and "target portion," respectively. Although specific reference may be made in this text to the use of the invention in the manufacture of ICs, it should be explicitly understood that the invention has many other possible applications. For example, it may be employed in conjunction with the manufacture of integrated optical systems, guidance and detection patterns for magnetic domain memories, liquid-crystal display panels, thin-film magnetic heads, etc. The skilled artisan will appreciate that, in the context of such alternative applications, any use of the terms "reticle", "wafer" or "die" in this text should be considered as being replaced by the more general terms "mask", "substrate" and "target portion", respectively.

In the present document, the terms "radiation" and "beam" are used to encompass all types of electromagnetic radiation, including ultraviolet radiation (e.g. with a wavelength of 365, 248, 193, 157 or 126 nm) and EUV (extreme ultra-violet radiation, e.g. having a wavelength in the range 5-20 nm).

The term mask as employed in this text may be broadly interpreted as referring to generic patterning means that can be used to endow an incoming radiation beam with a patterned cross-section, corresponding to a pattern that is to be created in a target portion of the substrate; the term "light valve" can also be used in this context. Besides the classic mask (transmissive or reflective; binary, phase-shifting, hybrid, etc.), examples of other such patterning means include:

a programmable mirror array. An example of such a device is a matrix-addressable surface having a viscoelastic control layer and a reflective surface. The basic principle behind such an apparatus is that (for example) addressed areas of the reflective surface reflect incident light as diffracted light, whereas unaddressed areas reflect incident light as undiffracted light. Using an appropriate filter, the said undiffracted light can be filtered out of the reflected beam, leaving only the diffracted light behind; in this manner, the beam becomes patterned according to the addressing pattern of the matrix-addressable surface. The required matrix addressing can be performed using suitable electronic means. More information on such mirror arrays can be gleaned, for example, from U.S. Pat. No. 5,296,891 and U.S. Pat. No. 5,523,193, which are incorporated herein by reference.

a programmable LCD array. An example of such a construction is given in U.S. Pat. No. 5,229,872, which is incorporated herein by reference.

The invention itself, together with further objects and advantages, can be better understood by reference to the following detailed description and the accompanying drawings.

DETAILED DESCRIPTION

Figure 1:
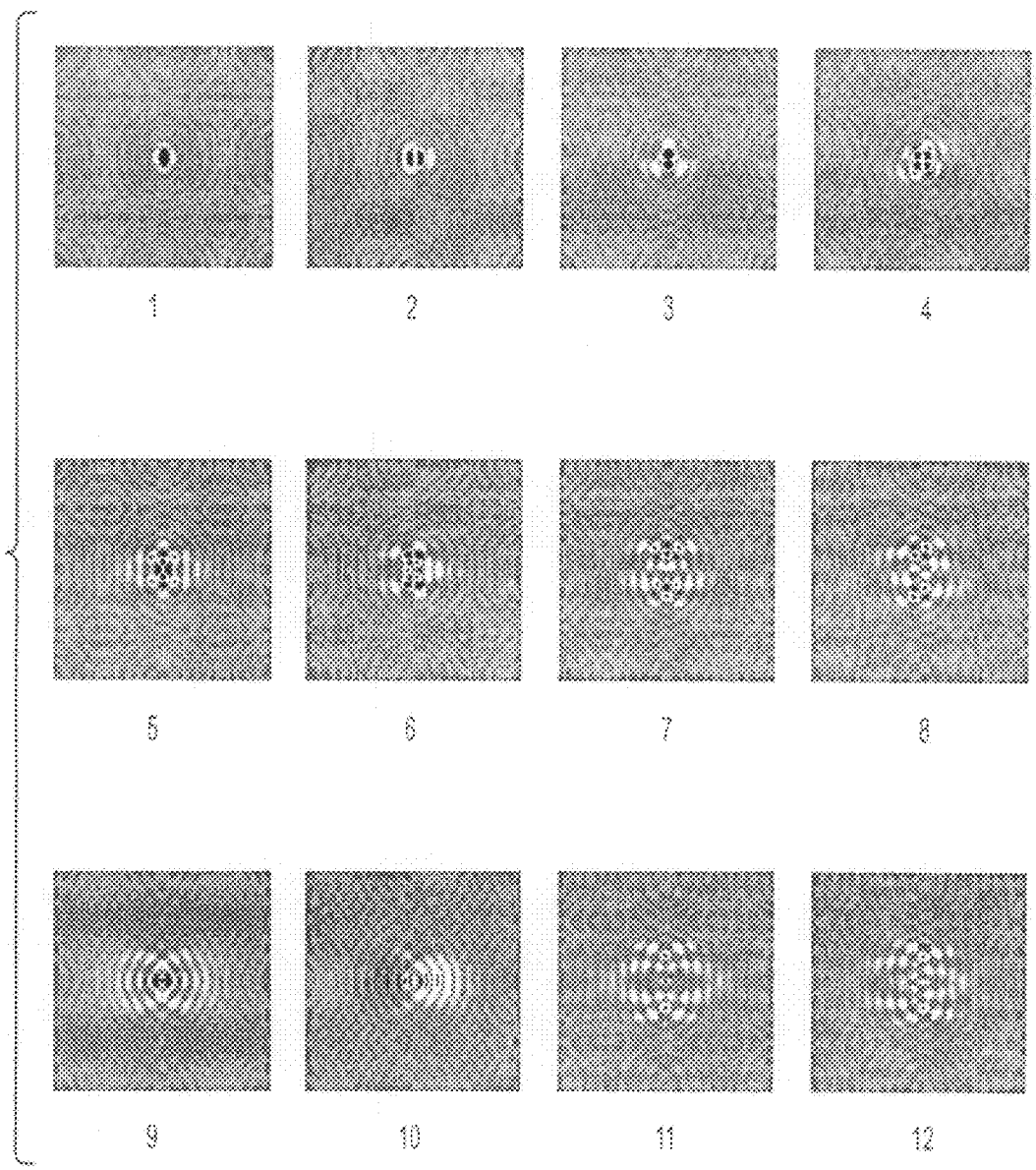
FIG. 1 is an example illustrating the first 12 optical kernels of an optical system at best focus with x-oriented dipole illuminator with $\sigma_{max}=0.93$ and $\sigma_{min}=0.69$ and lobe span angle of 90°.
Figure 2:
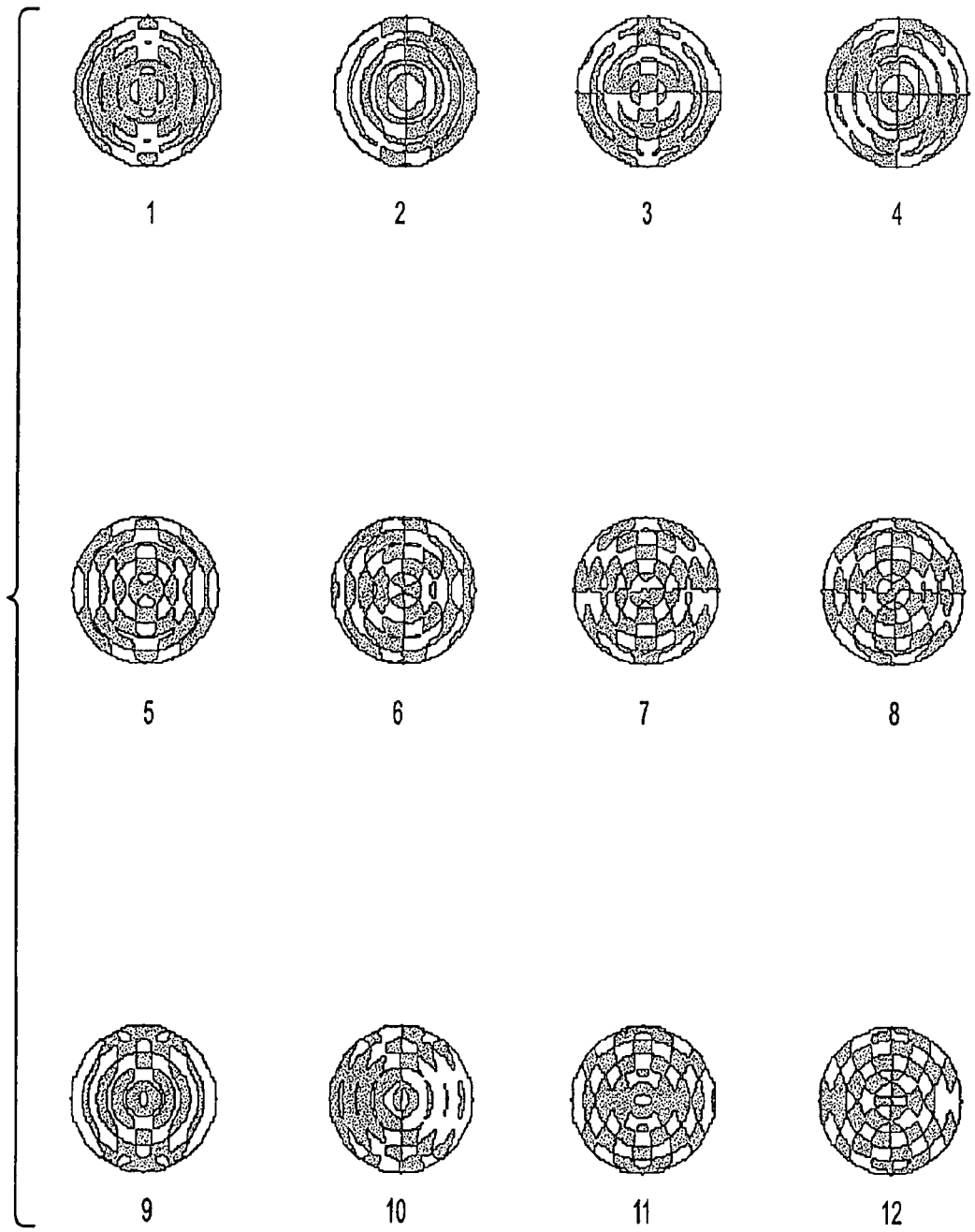
FIG. 2 is a first example of discretized calibration patterns $M_{\phi_m}(\vec{x})$ for the optical kernels in FIG. 1.
Figure 3:
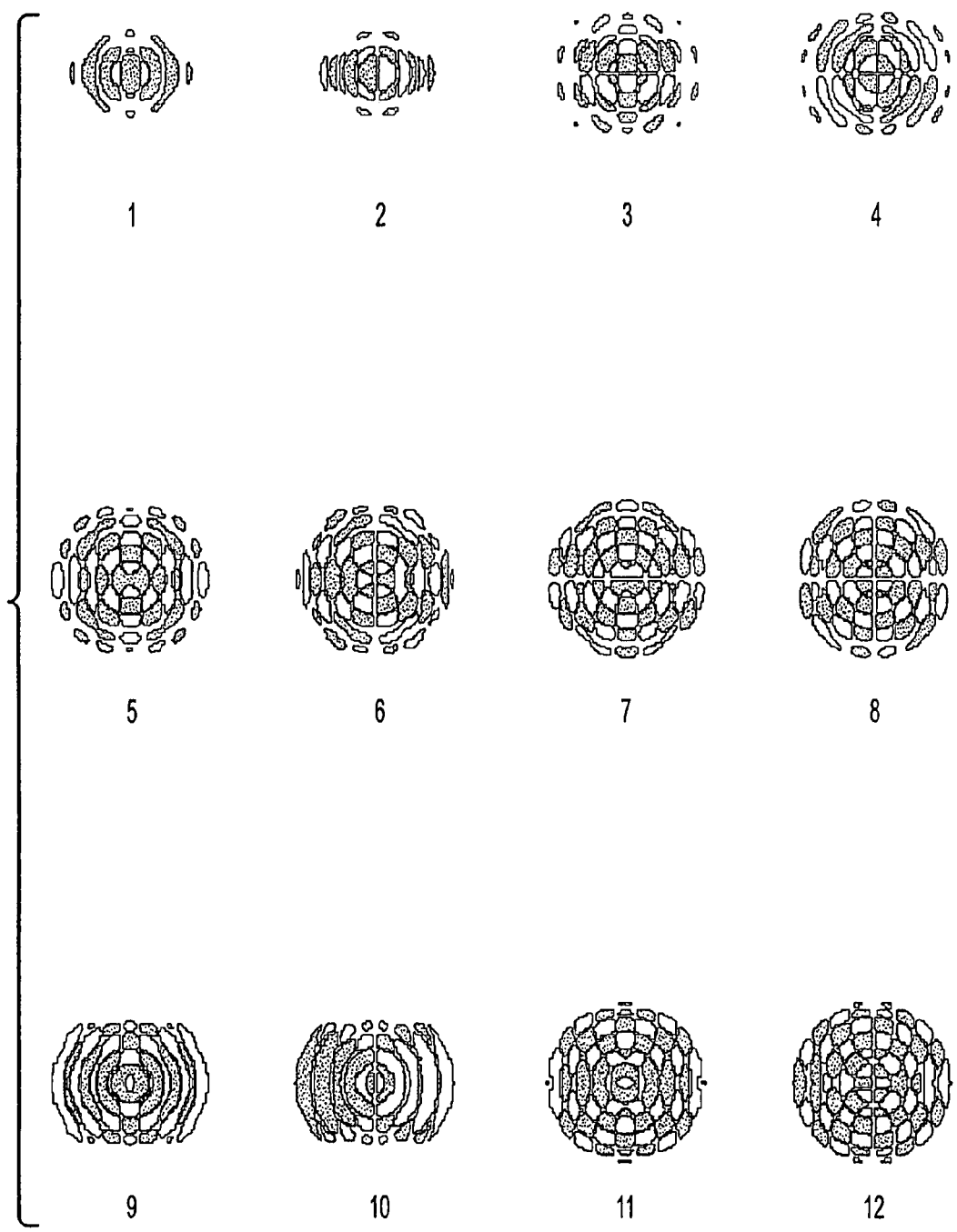
FIG. 3 is a second example of discretized calibration patterns $M_{\phi_m}(\vec{x})$ for the optical kernels in FIG. 1.
Figure 4A:
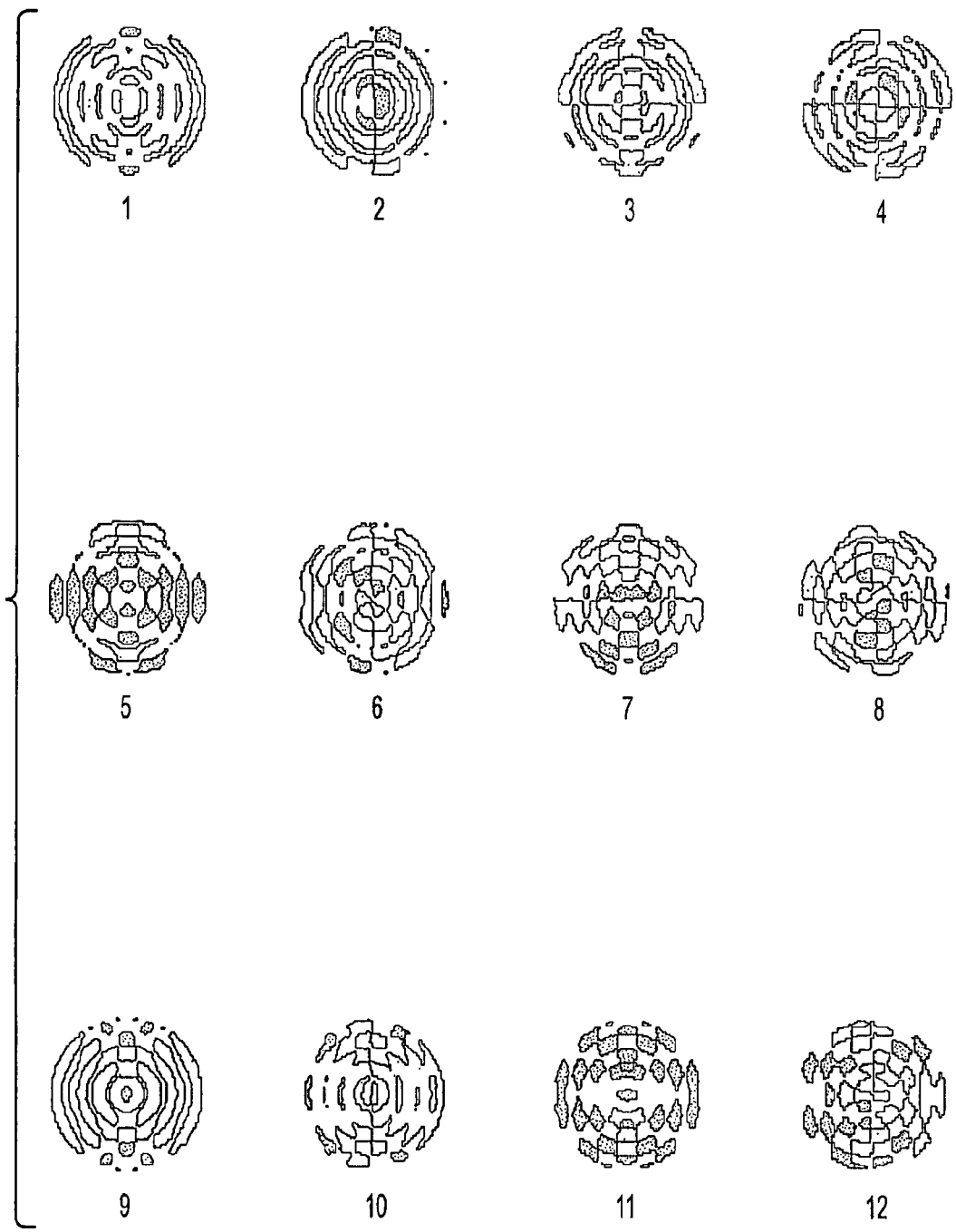
FIG. 4 is a third example of discretized calibration patterns for the optical kernels in FIG. 1.
Figure 4B:
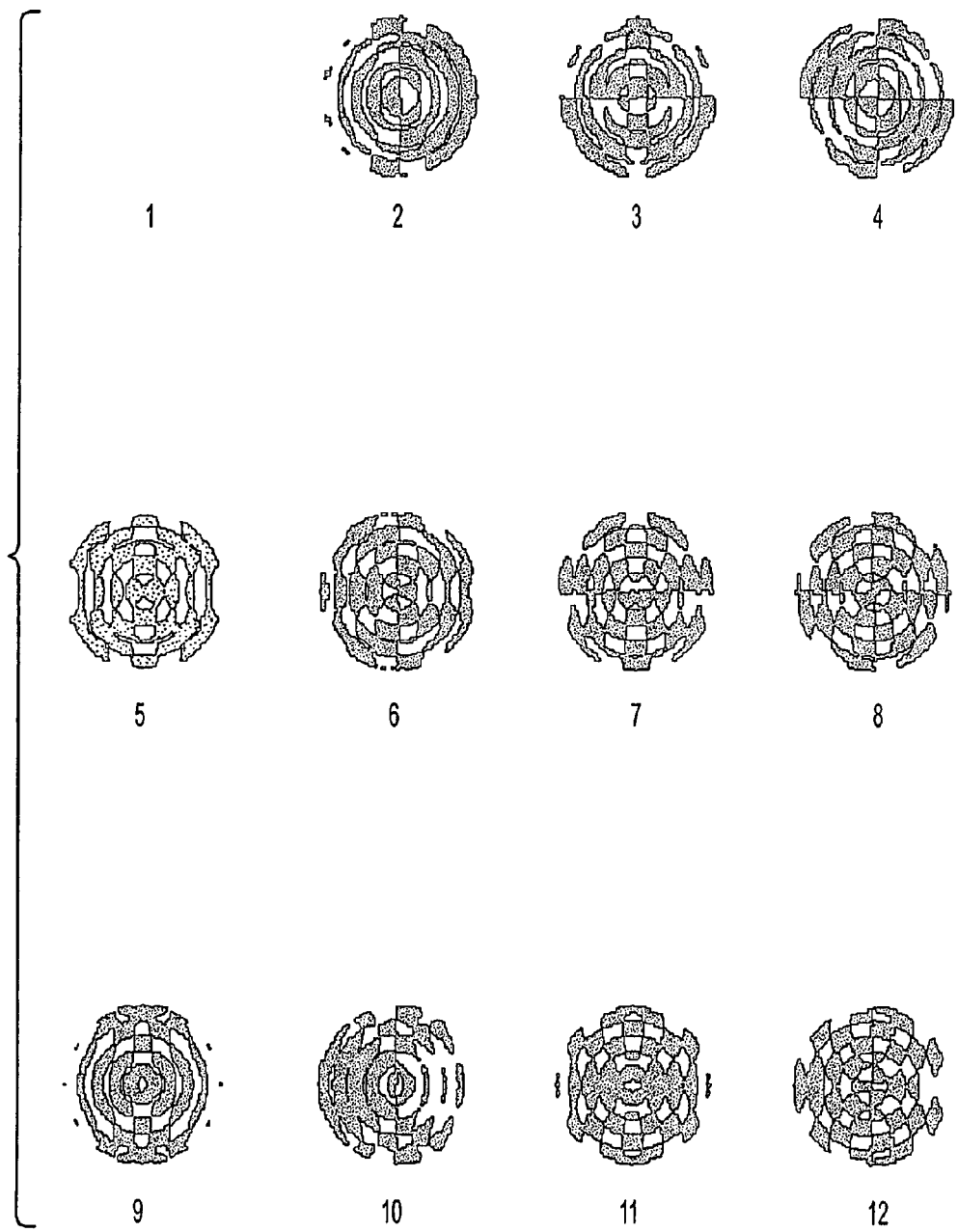

Prior to discuss the method of generating test/calibration patterns of the present invention, a brief overview regarding simulation of an imaging system is provided. It is known that an optical imaging system employing partially coherent light to form an image of an object can be described utilizing, for example, a cross-correlation transform, otherwise known as the transmission cross coefficients (TCC). Specifically, the intensity $I_1(\vec{x}_1)$ at the image point $\vec{x}_1$ is given by:

$$I_1(\vec{x}_1) = \int\int\int_{-\infty}^{+\infty}\int tcc(\vec{f}';\vec{f}'')m(\vec{f}')m^*(\vec{f}'')e^{-2\pi i(\vec{f}'-\vec{f}'')\vec{x}_1}d\vec{f}'\,d\vec{f}''$$

$$tcc(\vec{f}';\vec{f}'') = \int\int_{-\infty}^{+\infty}J_0(\vec{f})k(\vec{f}+\vec{f}')k^*(\vec{f}+\vec{f}'')d\vec{f}$$

where the vector $\vec{f}$ designates spatial frequency coordinates $(f_x, f_y)$ in the pupil plane and $j_{\vec{0}}(\vec{f})$, $m(\vec{f})$, $k(\vec{f})$, $tcc(\vec{f}';\vec{f}'')$ represent the pupil plane versions of the mutual intensity incident on the mask/object, the mask pattern, the pupil function of the imaging system, and the transmission cross coefficients, respectively. The pupil plane quantities are related to their image plane versions via the two-dimensional Fourier transform. The foregoing formulation treats the fields as scalar quantities and represents imaging within the paraxial approximation. When the vector nature of the light fields is accounted for, the properties of the illumination and the optical system can still be expressed in terms of a transmission cross coefficient matrix. It is noted that the transmission cross coefficient formulation of the image formation has also been extended to include the optical effects of recording the imaged pattern in photoresist, where the resist is part of a thin film stack on a semiconductor wafer. In these cases, the expression for the transmission cross coefficients is more complex than above but the expression for the image intensity does not change. The transmission cross coefficients, $tcc(\vec{f}';\vec{f}'')$ is a four-dimensional filter that describes the spatial filtering produced by optical imaging system, including the effects, for example, of illumination of the mask (i.e. object), the effects of finite optics aperture size, and thin film effects.

The four-dimensional $tcc(\vec{f}';\vec{f}'')$ filter can be approximated using singular value decomposition. The $tcc(\vec{f}';\vec{f}'')$ is represented in terms of its eigenvalues $\lambda_m$ and orthogonal eigenfunctions $\Phi_m(\vec{f})$, often called "kernels", as follows:

$$tcc(\vec{f}';\vec{f}'') \approx \sum_m^{m_{max}} \lambda_m \Phi_m(\vec{f}')\Phi_m^*(\vec{f}'')$$

Truncating the expansion and using only $m_{max}$ terms represents the approximation. With this approximation, the image intensity can be written as $$I_1(\vec{x}_1) \approx \sum_m^{m_{max}} \lambda_m \left| \int\int_{-\infty}^{+\infty} \Phi_m(\vec{f}')m(\vec{f}')e^{-2\pi i(\vec{f}'\cdot\vec{x}_1)}d\vec{f}' \right|^2$$

or $$I_1(\vec{x}_1) \approx \sum_m^{m_{max}} \lambda_m \left| \int\int_{-\infty}^{+\infty} \phi_m(\vec{x})M(\vec{x}+\vec{x}_1)d\vec{x} \right|^2$$

where $\phi_m(\vec{x})$ and $\Phi_m(\vec{f})$ and $m(\vec{f})$ and $M(\vec{x})$ are Fourier transform pairs. The properties of the eigenfunctions and the number of terms in the eigenfunction expansion depend on the optical system of interest.

Thus, as the transmission cross coefficients describe the spatial filtering process produced by the image formation, so does the set of eigenfunctions. The basis of the present invention is that a desirable calibration pattern will contribute to all the terms in the intensity expansion (i.e., the simulation model/equation). As such, if the calibration pattern contributes to every term, then the properties of substantial all types of pattern that that can be transmitted by the imaging system (or simulated by the imaging model) have been included and considered during the model calibration process. In other words, a calibration pattern set that produces a significant contribution to every eigenterm in the simulation model equation is sufficient in representing any pattern that could be transmitted by the imaging system. It is further noted that the photoresist effects in lithography applications, though not included in the eigenmodes, will be automatically accounted for with this approach by virtue of the photoresist being used in the patterning process.

A first embodiment of the method of generating the calibration patterns for use in the model calibration process will now be described. Since the eigenfunctions are mutually orthogonal, if the mask pattern $M(\vec{x})$ is chosen to be the set of kernels $\phi_m(\vec{x})$, the set will contribute to all the terms in the series. As a practical matter, there are essentially two limitations: a) the kernels $\phi_m(\vec{x})$ are complex continuous functions and it is impractical to fabricate a mask with transmission equal to the kernel spatial profile, and b) the summation used in practice has a finite number of terms and thus the components of $tcc(\vec{f}';\vec{f}'')$ corresponding to the high order terms will not be included. It is noted that a typical decomposition of the discretized $tcc(\vec{f}';\vec{f}'')$ transform may have on the order of one to several thousand terms but only tens of terms are typically utilized in the approximation. Since the eigenvalues of the high order terms are usually very small, such an approximation is quite accurate. The foregoing two limitations can be addressed as follows. First, a discretized version of each $\phi_m(\vec{x})$, designated here as $M_{\phi_m}(\vec{x})$, which maximizes the overlap integral with $\phi_m(\vec{x})$ can be used as the mask pattern. This can be summarized in equation form as follows:

$$\text{find } M_{\phi_m}(\vec{x}) \text{ that maximizes } \left| \int \int_{-\infty}^{+\infty} \phi_m(\vec{x}) M_{\phi_m}(\vec{x}+\vec{x}_1) d\vec{x} \right|^2$$

Second, the number of terms used for calibration purposes should match the number of terms $m_{max}$ used in the aerial image calculation in the empirical model used in the application of interest. The orders higher than $m_{max}$ are not included in the empirical imaging model and thus need not be included in the calibration set.

Some examples of the kernels and discretized calibration patterns $M_{\phi_m}(\vec{x})$ are illustrated in FIGS. 1-4. Assuming that the mask pattern transmission is piecewise-constant, which is correct to the first order under the thin mask approximation, the integral above will be maximized for a pattern that has a transmission of the same sign as the kernel $\phi_m(\vec{x})$. For example, for an alternating phase shift mask with possible field transmission values of 0, 1, and −1, the best pattern would be positive where the kernel $\phi_m(\vec{x})$ is positive and vice versa. Since the above expression is a magnitude, it would also be maximized for a pattern that is positive where the kernel $\phi_m(\vec{x})$ is negative and vice versa. For an attenuated phase shift mask with possible field transmission values of 0, 1, and −t, the best pattern is one that is clear for the regions where $\phi_m(\vec{x})$ is positive and has the phase shifter with transmission −t where $\phi_m(\vec{x})$ is negative. The complementary pattern with clear where $\phi_m(\vec{x})$ is negative and phase shifter where $\phi_m(\vec{x})$ is positive may also be useful. Similarly, a suitable pattern for a binary mask with field transmission of 0 and 1 can be constructed. It would consist of two complementary patterns: i) one that is clear where $\phi_m(\vec{x})$ is positive and ii) one that is clear where $\phi_m(\vec{x})$ is negative. To minimize the size of each calibration pattern, it is beneficial to use the above approach only in regions where the each $\phi_m(\vec{x})$ contains significant energy, i.e. it may be advisable to apply the above up to some maximum radius and assume zero transmission beyond that radius (see, FIG. 2). Another possibility is to add zero-transmission shielding in regions where $\phi_m(\vec{x})$ is below some threshold value and would not contribute significantly to the overlap integral above (see, FIG. 3).

Figure 5:
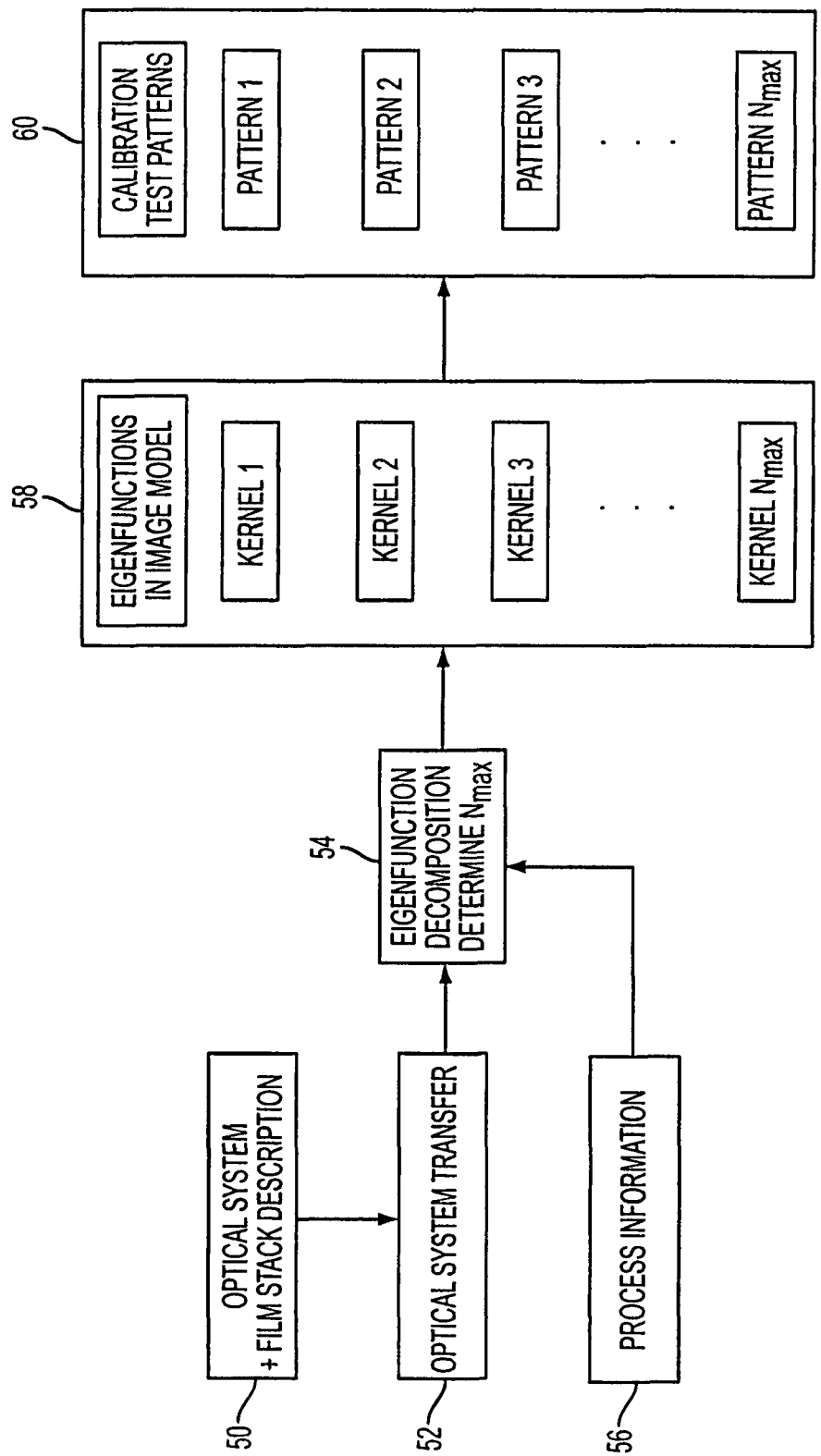
FIG. 5 is an exemplary flow chart illustrating the process of determining the optimal calibration test patterns in accordance with the present invention.

FIG. 5 is an exemplary flow chart illustrating the process of generating the optimal test patterns in accordance with the present invention. Referring to FIG. 5, the first step (Step 50) in the process is to define the optical system which to be utilized as the basis for the calibration process. The next step (Step 52) is to generate a model (i.e., equation) of the optical system which is transfer function, for example, a TCC. Next (Step 54), the model/transfer function is approximated utilizing a series of eigen functions. The number of eigen functions utilized in the approximation is dependent on the given system being utilized and the desired level of accuracy of the model. Nmax represents the number of eigen functions utilized in the approximation. As noted above, it is acceptable to eliminate the higher order terms of the approximation as such terms are typically small in value, and therefore do not substantially affect the simulation results. It is noted that process information is also included and considered when decomposing the model function into a series of eigen functions (Step 56).

As noted above, in the given embodiment, the transfer function (TCC) is approximated by using singular value decomposition, which yields a series of eigenvalues and orthogonal eigenfunctions. For a continuous space, the series is infinite. For a discrete space (a limited resolution or pixel size) the series may comprise several thousand terms. As such, it is necessary to eliminate high order terms of the series. Typically, only the first 10 or 20 terms (low order) are important because the eigenvalues of the high order terms are usually very small. As noted, the number of necessary terms depends upon the optical system and process which is being modeled, as well as the desired level of accuracy. Thus, the optical imaging system is modeled as a function of a relatively small number (Nmax) of eigenvalues and orthogonal eigenfunctions.

Next, in Step 58, each low order orthogonal eigenfunction is defined utilizing a kernel, where each of these kernels essentially corresponds to an independent function of the model. As such, there are N kernels utilized to represent the imaging model. Thereafter, in the next step (Step 60) calibration test patterns are selected such that each kernel of the imaging model is manipulated or affected by at least one of the test patterns. In other words, at least one of the calibration test patterns produces a significant contribution to each kernel. By selecting the calibration test patterns in this manner, it is possible to ensure that each kernel will be affected/manipulated during the calibration process. As one example, it is possible to select an individual pattern for each kernel such that there is a one-to-one correspondence between each test pattern and each model kernel (i.e., pattern 1 will test kernel 1, pattern 2 will test kernel 2, etc.).

Accordingly, since the combination of the N kernels represents the model of the imaging system, by confirming that each of the kernels will be manipulated during the calibration process, it is possible to fully calibrate the model for essentially any pattern that can be transmitted by the imaging system. As a result, the method of the present invention generates an optimal calibration test pattern that is subsequently utilized to calibrate the imaging model.

Figure 6:
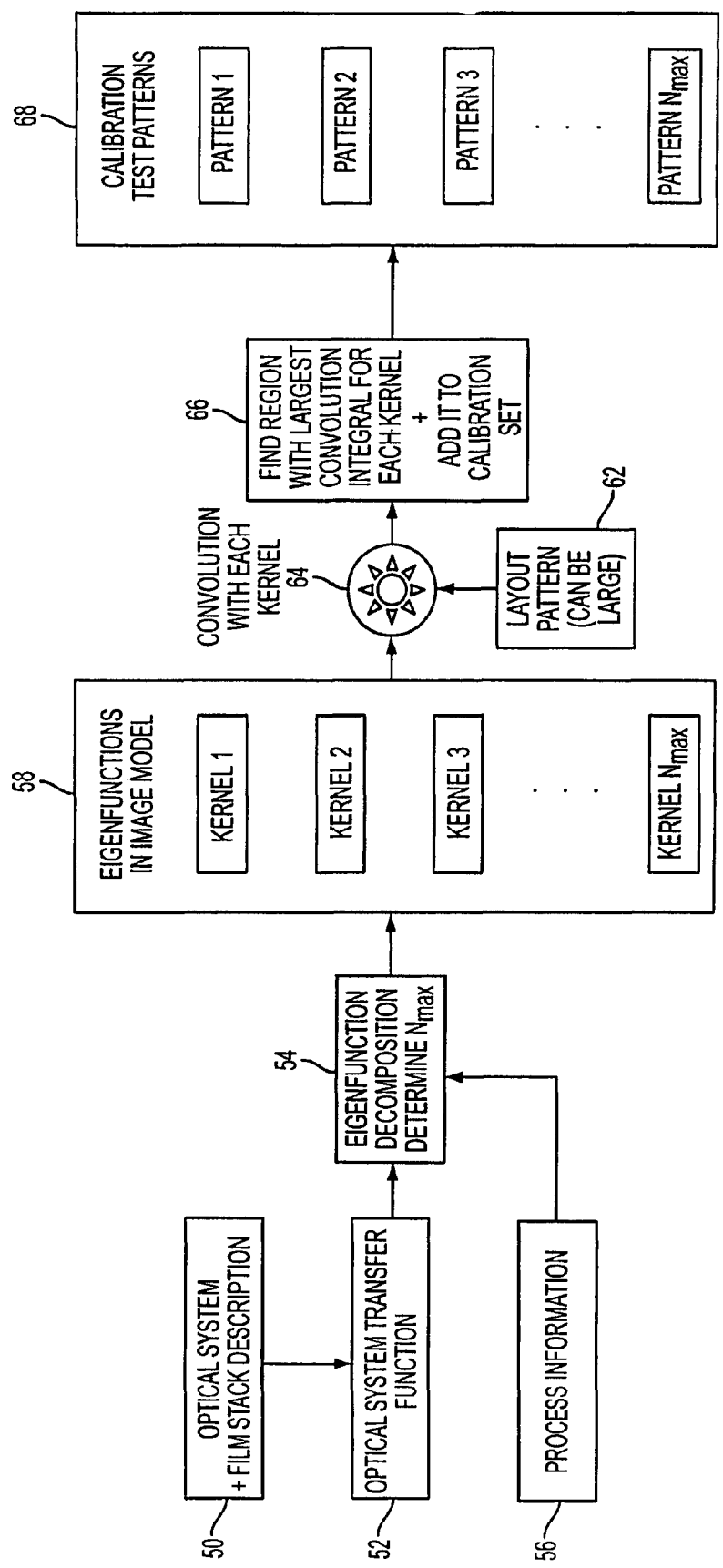
FIG. 6 is an exemplary is an exemplary flow chart illustrating the process of determining the optimal calibration test patterns in accordance with a second embodiment of the present invention.

In a second embodiment of the present invention, calibration test patterns are determined from an arbitrary layout. More specifically, in cases where the optimal calibration patterns $M_{\phi_m}(\vec{x})$ cannot be included on the mask, suitable calibration test patterns can be selected from the available pattern data. FIG. 6 is an exemplary flow chart illustrating the process of generating the optimal test patterns in accordance with the second embodiment of the present invention. It is noted that process Steps 50, 52, 54, 56 and 58 are the same as those in the first embodiment detailed above. Continuing from that point, the process of the second embodiment is as follows. For each kernel in the expansion series of the aerial image calculation, first calculate (Step 64) an overlap integral $I_{\phi_m}(\vec{x}_1)$ of the available mask pattern $M(\vec{x})$ (the layout pattern is obtained in Step 62) with the kernel $\phi_m(\vec{x})$:

$$I_{\phi_m}(\vec{x}_1) = \left| \int \int_{-\infty}^{+\infty} \phi_m(\vec{x}) M(\vec{x}+\vec{x}_1) d\vec{x} \right|^2$$

Then, find several locations $\vec{x}_1$ in the layout that produce the largest overlap $I_{\phi_m}(\vec{x}_1)$ and select regions around $\vec{x}_1$ as the calibration patterns, i.e. locations $\vec{x}_1$ where the overlap integral is the largest (Step 66). The size of the selected calibration region around each $\vec{x}_1$ location should be of optically significant size, i.e. something on the order of 20 resolution units λ/NA in diameter (or a rectangular region of 20 λ/NA by 20 λ/NA in size), where λ is the optical wavelength and NA is the optical system numerical aperture. Selecting several patterns for each kernel (Step 68) ensures that the calibration set will be comprised of patterns that collectively have all the spatial frequency components that are transmitted by the optical system.

Under certain conditions, the optical system eigenfunctions come in degenerate pairs or possibly degenerate multiples. With degenerate kernels, the image intensity needs to include contributions from the entire degenerate set. Consequently, the pattern selection should be performed for the entire degenerate set (usually a pair). In this case, the overlap integral becomes a sum over the degenerate pair d:

$$I_{\phi_m}(\vec{x}_1) = \sum_d \left| \int \int \int_{-\infty}^{+\infty} \phi_{dm}(\vec{x}) M(\vec{x}+\vec{x}_1) d\vec{x} \right|^2$$

The suitable locations $\vec{x}_1$ for centers of the calibration regions are selected as described above for non-degenerate kernels. The zero-order kernel represents another special case. More specifically, since for most optical systems, the zero-order kernel produces the largest overlap integral for the mask clear field, where no features are printed, choosing the clear-field areas for calibration is not appropriate. For the zero-order kernel, it is sensible to select a region with a wide range of values, from zero to the maximum, for the overlap integral.

Given a set of patterns to choose from for calibration, the overlap integral $I_{\phi_m}(\vec{x}_1)$ should be computed for each pattern and each kernel used in the imaging model. As a practical matter, suitable locations $\vec{x}_1$ in the patterns may be found by searching for areas where the different overlap integrals exceed some threshold. The thresholds for each overlap $I_{\phi_m}(\vec{x}_1)$ should be significantly larger than the average value of the overlap integral over a large set of patterns. Among the patterns selected by finding regions with large mask-kernel overlap integrals, patterns that cover multiple kernels in the image model are good for calibration purposes. If the available pattern set is not producing a strong signal with respect to a particular kernel, it means that the pattern set is not "sampling" that kernel. Since that kernel is necessary in the model, another pattern that has a better signal with respect to that kernel needs to be added to the calibration set. If a pattern is good for most but not all kernels, it should be used but other patterns that capture the effects of the unsampled kernels should still be identified and added to the calibration set. As with the first embodiment, the calibration test pattern set chosen for calibrating the imaging model should sample all of the kernels used in the imaging model.

Alternatives to the foregoing embodiments of the present invention are also possible. For example, during the optimization of the model parameters, the different calibration test patterns can be assigned different relative weights. Several possible starting points for the model optimization are possible. After finding the contribution $C_m$ $$C_m = \sum_k \mu_k \int \left| \int \int_{-\infty}^{+\infty} \phi_m(\vec{x}) M_k(\vec{x}+\vec{x}_1) d\vec{x} \right|^2 dx_1 \bigg/ \int dx_1$$

to the intensity from each eigenmode $\phi_m(\vec{x})$, averaged over all the test patterns $M_k(\vec{x})$, the relative weights $\mu_k$ of the test patterns can be adjusted so that (i) all $C_m$ are equal, (ii) $C_m$ are proportional to the eigenvalues $\lambda_m$, (iii) $C_m$ are inversely proportional to the eigenvalues $\lambda_m$, or (iv) best optimization cost function is obtained for the calibration set. Other weighting approaches are also possible.

In another variation, when calibrating across the lithographic process window, the foregoing methods can be applied by using eigenmodes of the optical system at several focus settings. The suitable test patterns should be chosen using the eigenmodes for at least three focus settings, including best focus as well as maximum and minimum defocus expected during the imaging process. The calibration then should be performed for data collected at the three different defocus settings and possibly at different exposure doses.

As mentioned above, the method of the present invention provides significant advantages over the prior art. Most importantly, the method provides for the determination of optimal calibration or test patterns to be utilized for calibrating an imaging simulation model. The calibration test patterns optimize the usefulness or robustness of the model while simultaneously reducing the number of calibration patterns necessary for the calibration process so as to minimize the time required for the calibration process.

Figure 7:
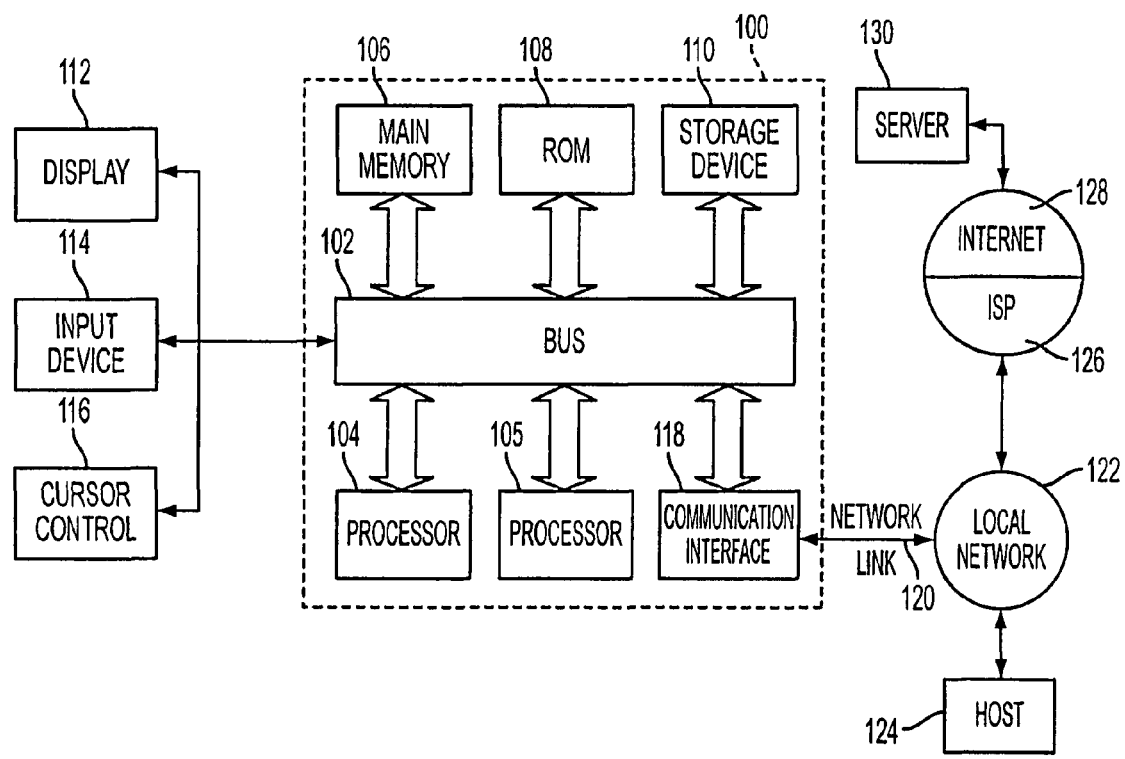
FIG. 7 is a block diagram that illustrates a computer system which can be utilized to implement a process of determining calibration test patterns according to the present invention.

FIG. 7 is a block diagram that illustrates a computer system 100 which can assist in the method of generating/determining the calibration test patterns in accordance with the present invention. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT) or flat panel or touch panel display for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane. A touch panel (screen) display may also be used as an input device.

Simulation operations and determination of the calibration test patterns may be performed by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. One or more processors in a multi-processing arrangement may also be employed to execute the sequences of instructions contained in main memory 106. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media include, for example, optical or magnetic disks, such as storage device 110. Volatile media include dynamic memory, such as main memory 106. Transmission media include coaxial cables, copper wire and fiber optics, including the wires that comprise bus 102. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be borne on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also preferably includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the worldwide packet data communication network, now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120, and communication interface 118. In the Internet example, a server 130 might transmit a requested code for an application program through Internet 128, ISP 126, local network 122 and communication interface 118. In accordance with the invention, one such downloaded application provides for the determination of the calibration test patterns. The received code may be executed by processor 104 as it is received, and/or stored in storage device 110, or other non-volatile storage for later execution. In this manner, computer system 100 may obtain application code in the form of a carrier wave.

Figure 8:
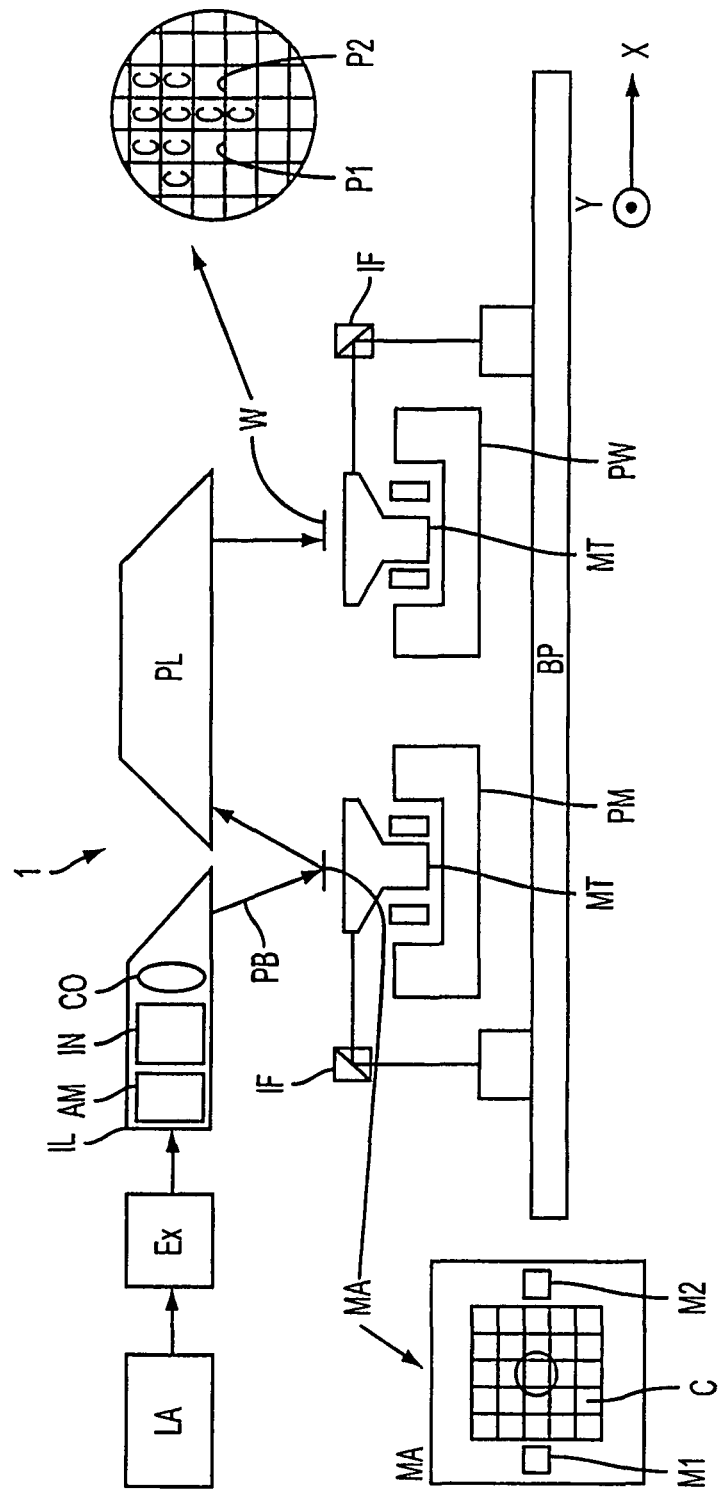
FIG. 8 schematically depicts a lithographic projection apparatus suitable for use with a mask designed with the aid of an embodiment of the present invention.

FIG. 8 schematically depicts an exemplary lithographic projection apparatus that could be the basis of simulation model to be tuned utilizing the calibration patterns generated/determined utilizing the process of present invention. The apparatus comprises:

a radiation system Ex, IL, for supplying a projection beam PB of radiation. In this particular case, the radiation system also comprises a radiation source LA;

a first object table (mask table) MT provided with a mask holder for holding a mask MA (e.g., a reticle), and connected to first positioning means for accurately positioning the mask with respect to item PL;

a second object table (substrate table) WT provided with a substrate holder for holding a substrate W (e.g., a resist-coated silicon wafer), and connected to second positioning means for accurately positioning the substrate with respect to item PL;

a projection system ("lens") PL (e.g., a refractive, catoptric or catadioptric optical system) for imaging an irradiated portion of the mask MA onto a target portion C (e.g., comprising one or more dies) of the substrate W.

As depicted herein, the apparatus is of a transmissive type (i.e., has a transmissive mask). However, in general, it may also be of a reflective type, for example (with a reflective mask). Alternatively, the apparatus may employ another kind of patterning means as an alternative to the use of a mask; examples include a programmable mirror array or LCD matrix.

The source LA (e.g., a mercury lamp or excimer laser) produces a beam of radiation. This beam is fed into an illumination system (illuminator) IL, either directly or after having traversed conditioning means, such as a beam expander Ex, for example. The illuminator IL may comprise adjusting means AM for setting the outer and/or inner radial extent (commonly referred to as σ-outer and σ-inner, respectively) of the intensity distribution in the beam. In addition, it will generally comprise various other components, such as an integrator IN and a condenser CO. In this way, the beam PB impinging on the mask MA has a desired uniformity and intensity distribution in its cross-section.

It should be noted with regard to FIG. 8 that the source LA may be within the housing of the lithographic projection apparatus (as is often the case when the source LA is a mercury lamp, for example), but that it may also be remote from the lithographic projection apparatus, the radiation beam that it produces being led into the apparatus (e.g., with the aid of suitable directing mirrors); this latter scenario is often the case when the source LA is an excimer laser (e.g., based on KrF, ArF or $F_2$ lasing). The current invention encompasses at least both of these scenarios.

The beam PB subsequently intercepts the mask MA, which is held on a mask table MT. Having traversed the mask MA, the beam PB passes through the lens PL, which focuses the beam PB onto a target portion C of the substrate W. With the aid of the second positioning means (and interferometric measuring means IF), the substrate table WT can be moved accurately, e.g. so as to position different target portions C in the path of the beam PB. Similarly, the first positioning means can be used to accurately position the mask MA with respect to the path of the beam PB, e.g., after mechanical retrieval of the mask MA from a mask library, or during a scan. In general, movement of the object tables MT, WT will be realized with the aid of a long-stroke module (coarse positioning) and a short-stroke module (fine positioning), which are not explicitly depicted in FIG. 8. However, in the case of a wafer stepper (as opposed to a step-and-scan tool) the mask table MT may just be connected to a short stroke actuator, or may be fixed.

The depicted tool can be used in two different modes:

In step mode, the mask table MT is kept essentially stationary, and an entire mask image is projected in one go (i.e., a single "flash") onto a target portion C. The substrate table WT is then shifted in the x and/or y directions so that a different target portion C can be irradiated by the beam PB;

In scan mode, essentially the same scenario applies, except that a given target portion C is not exposed in a single "flash". Instead, the mask table MT is movable in a given direction (the so-called "scan direction", e.g., the y direction) with a speed v, so that the projection beam PB is caused to scan over a mask image; concurrently, the substrate table WT is simultaneously moved in the same or opposite direction at a speed V=Mv, in which M is the magnification of the lens PL (typically, M=¼ or ⅕). In this manner, a relatively large target portion C can be exposed, without having to compromise on resolution.

The concepts disclosed herein may simulate or mathematically model any generic imaging system for imaging sub wavelength features, and may be especially useful with emerging imaging technologies capable of producing wavelengths of an increasingly smaller size. Emerging technologies already in use include EUV (extreme ultra violet) lithography that is capable of producing a 193 nm wavelength with the use of a ArF laser, and even a 157 nm wavelength with the use of a Fluorine laser. Moreover, EUV lithography is capable of producing wavelengths within a range of 20-5 nm by using a synchrotron or by hitting a material (either solid or a plasma) with high energy electrons in order to produce photons within this range. Because most materials are absorptive within this range, illumination may be produced by reflective mirrors with a multi-stack of Molybdenum and Silicon. The multi-stack mirror has a 40 layer pairs of Molybdenum and Silicon where the thickness of each layer is a quarter wavelength. Even smaller wavelengths may be produced with X-ray lithography. Typically, a synchrotron is used to produce an X-ray wavelength. Since most material is absorptive at x-ray wavelengths, a thin piece of absorbing material defines where features would print (positive resist) or not print (negative resist).

While the concepts disclosed herein may be used for imaging on a substrate such as a silicon wafer, it shall be understood that the disclosed concepts may be used with any type of lithographic imaging systems, e.g., those used for imaging on substrates other than silicon wafers.

Although the present invention has been described and illustrated in detail, it is to be clearly understood that the same is by way of illustration and example only and is not to be taken by way of limitation, the scope of the present invention being limited only by the terms of the appended claims.

What is claimed is:

1. A computer-implemented method of selecting a set of calibration test patterns to be utilized to calibrate a model for simulating the imaging performance of a lithographic process for generating an aerial image corresponding to a target pattern for an integrated circuit; said method comprising the steps of:
    defining said model as a plurality of discrete functions;
    identifying a respective calibration pattern for each of said plurality of discrete functions, including determining that each identified calibration pattern is operative for manipulating said respective one of said plurality of discrete functions more than any other of said plurality of discrete functions during a process for calibrating said model that has yet to be performed; and
    storing said calibration test patterns, said stored calibration test patterns being utilized as said set of calibration patterns to calibrate said model for simulating the imaging performance of said lithographic process,
    wherein one or more of the above steps are implemented by the computer.

2. The method of selecting an optimum set of calibration test patterns according to claim 1, wherein a distinct calibration test pattern is identified as corresponding to each of said plurality of discrete functions.

3. The method of selecting an optimum set of calibration test patterns according to claim 2, wherein each of said plurality of discrete functions comprises an eigenfunction, said eigenfunctions being mutually orthogonal to one another.

4. The method of selecting an optimum set of calibration test patterns according to claim 1, wherein each of said discrete functions comprises a cross-correlation transform.

5. The method of claim 1, wherein the step of identifying a calibration test pattern for each of the plurality of discrete functions further includes:
    obtaining a mask layout comprising a plurality of patterns;
    calculating overlap integrals of the mask layout with each of the plurality of discrete functions;
    identifying regions in the mask layout with the highest overlap integral values; and
    using patterns in the mask layout from the identified regions with the highest overlap integral values as the selected calibration test pattern.

6. The method of claim 1, wherein the model is defined at one or more of different focus settings and different exposure doses.

7. A computer program product having a computer readable medium bearing a computer program for selecting a set of calibration test patterns to be utilized to calibrate a model for simulating the imaging performance of lithographic process for generating an aerial image corresponding to a target pattern for an integrated circuit, the computer program, when executed, causing a computer to perform the steps of:
    defining said model as a plurality of discrete functions;
    identifying a respective calibration pattern for each of said plurality of discrete functions, including determining that each identified calibration pattern is operative for manipulating said respective one of said plurality of discrete functions more than any other of said plurality of discrete functions during a process for calibrating said model that has yet to be performed; and
    storing said calibration test patterns, said stored calibration test patterns being utilized as said set of calibration patterns to calibrate said model for simulating the imaging performance of said lithographic process.

8. The computer program product according to claim 7, wherein a distinct calibration test pattern is identified as corresponding to each of said plurality of discrete functions.

9. The computer program product according to claim 8, wherein each of said plurality of discrete functions comprises an eigenfunction, said eigenfunctions being mutually orthogonal to one another.

10. The computer program product according to claim 7, wherein each of said discrete functions comprises a cross-correlation transform.

11. The computer program product of claim 7, wherein the step of identifying a calibration test pattern for each of the plurality of discrete functions performed by the computer further includes:

obtaining a mask layout comprising a plurality of patterns;

calculating overlap integrals of the mask layout with each of the plurality of discrete functions;

identifying regions in the mask layout with the highest overlap integral values; and using patterns in the mask layout from the identified regions with the highest overlap integral values as the selected calibration test pattern.

12. The computer program product of claim 7, wherein the model is defined at one or more of different focus settings and different exposure doses.

13. A computer-implemented method of calibrating a model for simulating the imaging performance of a lithographic process for generating an aerial image corresponding to a target pattern for an integrated circuit, said method comprising the steps of:

selecting a set of calibration test patterns to be utilized to calibrate said model;

adjusting variable parameters of said model such that a simulated imaging result of said model matches said calibration test patterns within a predefined error criteria;

wherein said selection of said set of calibration test patterns comprises:

defining said model as a plurality of discrete functions;

identifying a respective calibration pattern for each of said plurality of discrete functions, including determining that each identified calibration pattern is operative for manipulating said respective one of said plurality of discrete functions more than any other of said plurality of discrete functions during a process for calibrating said model that has yet to be performed; and storing said calibration test patterns, said stored calibration test patterns being utilized as said set of calibration patterns to calibrate said model for simulating the imaging performance of said lithographic process, wherein one or more of the above steps are implemented by a computer.

14. The method of calibrating a model for simulating the imaging performance of said lithographic process according to claim 13, wherein a distinct calibration test pattern is identified as corresponding to each of said plurality of discrete functions.

15. The method of calibrating a model for simulating the imaging performance of said lithographic process according to claim 14, wherein each of said plurality of discrete functions comprises an eigenfunction, said eigenfunctions being mutually orthogonal to one another.

16. The method of calibrating a model for simulating the imaging performance of said lithographic apparatus according to claim 13, wherein each of said discrete functions comprises a cross-correlation transform.

17. The method of claim 13, wherein the step of identifying a calibration test pattern for each of the plurality of discrete functions further includes:

obtaining a mask layout comprising a plurality of patterns;

calculating overlap integrals of the mask layout with each of the plurality of discrete functions;

identifying regions in the mask layout with the highest overlap integral values; and using patterns in the mask layout from the identified regions with the highest overlap integral values as the selected calibration test pattern.

18. The method of claim 13, wherein the model is defined at one or more of different focus settings and different exposure doses.

* * * * *